(12) United States Patent
Virzi et al.

(10) Patent No.: US 7,274,776 B1
(45) Date of Patent: *Sep. 25, 2007

(54) METHODS AND SYSTEMS FOR ROUTING A CALL

(75) Inventors: Robert Anthony Virzi, Wayland, MA (US); Marie Wenzel Meteer, Arlington, MA (US)

(73) Assignees: Verizon Laboratories Inc, Waltham, MA (US); BBNT Solutions LLC, Cambridge, MA (US)

( * ) Notice: Subject to any disclaimer, the term of this patent is extended or adjusted under 35 U.S.C. 154(b) by 68 days.

This patent is subject to a terminal disclaimer.

(21) Appl. No.: 11/049,102

(22) Filed: Feb. 2, 2005

Related U.S. Application Data

(63) Continuation of application No. 10/366,013, filed on Feb. 13, 2003, now Pat. No. 6,914,966.

(51) Int. Cl.
 *H04M 1/64* (2006.01)
(52) U.S. Cl. .................... 379/88.02; 704/273
(58) Field of Classification Search ............ 379/88.01, 379/88.02, 88.17, 142.06, 142.05; 704/273
 See application file for complete search history.

(56) References Cited

U.S. PATENT DOCUMENTS

| | | | |
|---|---|---|---|
| 4,582,956 A | | 4/1986 | Doughty |
| 5,544,229 A | * | 8/1996 | Creswell et al. ....... 379/114.05 |
| 5,572,583 A | | 11/1996 | Wheeler, Jr. et al. |
| 5,724,411 A | | 3/1998 | Eisdorfer et al. |
| 5,774,841 A | * | 6/1998 | Salazar et al. ............... 704/225 |
| 5,901,203 A | * | 5/1999 | Morganstein et al. .... 379/88.02 |
| 5,930,700 A | * | 7/1999 | Pepper et al. ............ 455/435.3 |
| 5,978,450 A | | 11/1999 | McAllister et al. |
| 6,005,870 A | * | 12/1999 | Leung et al. ................ 370/466 |
| 6,038,305 A | | 3/2000 | McAllister et al. |
| 6,101,242 A | | 8/2000 | McAllister et al. |
| 6,101,468 A | | 8/2000 | Gould et al. |
| 6,115,464 A | | 9/2000 | Lester et al. |
| 6,122,357 A | | 9/2000 | Farriss et al. |

(Continued)

FOREIGN PATENT DOCUMENTS

EP  0627837  12/1994

OTHER PUBLICATIONS

U.S. Appl. No. 09/823,997, filed Apr. 3, 2001, Farris et al.
U.S. Appl. No. 10/124,659, filed Apr. 17, 2002, Strauss et al.
"Black boxes help zap telemarketers", CNN.com/Technology, http://www.cnn.com/TEC/ptech/10/10/blackbox.revt/index.html, Oct. 10, 2002, pp. 1-3.

(Continued)

*Primary Examiner*—Fan Tsang
*Assistant Examiner*—Simon Sing

(57) ABSTRACT

Schemes for routing a call using caller identification are described herein. These schemes are termed "real caller ID" and can be capable of determining the identity of a calling party independent of a telephone number from which the call originated. According to one exemplary embodiment, a method of routing a call from a calling party to a receiving party may include accessing a database containing a plurality of voice templates of prior calling parties. Each voice template may have correlated therewith a call disposition parameter defined by the receiving party. Next, a voice response from the calling party may be compared with one of the plurality of voice templates stored in the database. Subsequently, the call may be routed to the receiving party based on a match between the voice response and the one of the plurality of voice templates.

18 Claims, 4 Drawing Sheets

U.S. PATENT DOCUMENTS

| | | |
|---|---|---|
| 6,167,119 A | 12/2000 | Bartholomew et al. |
| 6,219,669 B1 | 4/2001 | Haff et al. |
| 6,327,347 B1 * | 12/2001 | Gutzmann ............... 379/88.02 |
| 6,347,134 B1 | 2/2002 | Sherwood et al. |
| 6,356,868 B1 | 3/2002 | Yuschik et al. |
| 6,404,858 B1 | 6/2002 | Farris et al. |
| 6,512,818 B1 * | 1/2003 | Donovan et al. ........ 379/88.18 |
| 6,661,886 B1 * | 12/2003 | Huart et al. ........... 379/215.01 |
| 6,768,792 B2 * | 7/2004 | Brown et al. .......... 379/207.14 |

OTHER PUBLICATIONS

"Call Intercept—Verizon East", Verizon Internal Memo, Jul. 22, 1999, pp. 1-9.

"Call Intercept Service", Verizon Internal Memo, Jul. 7, 2000, pp. 1-28.

* cited by examiner

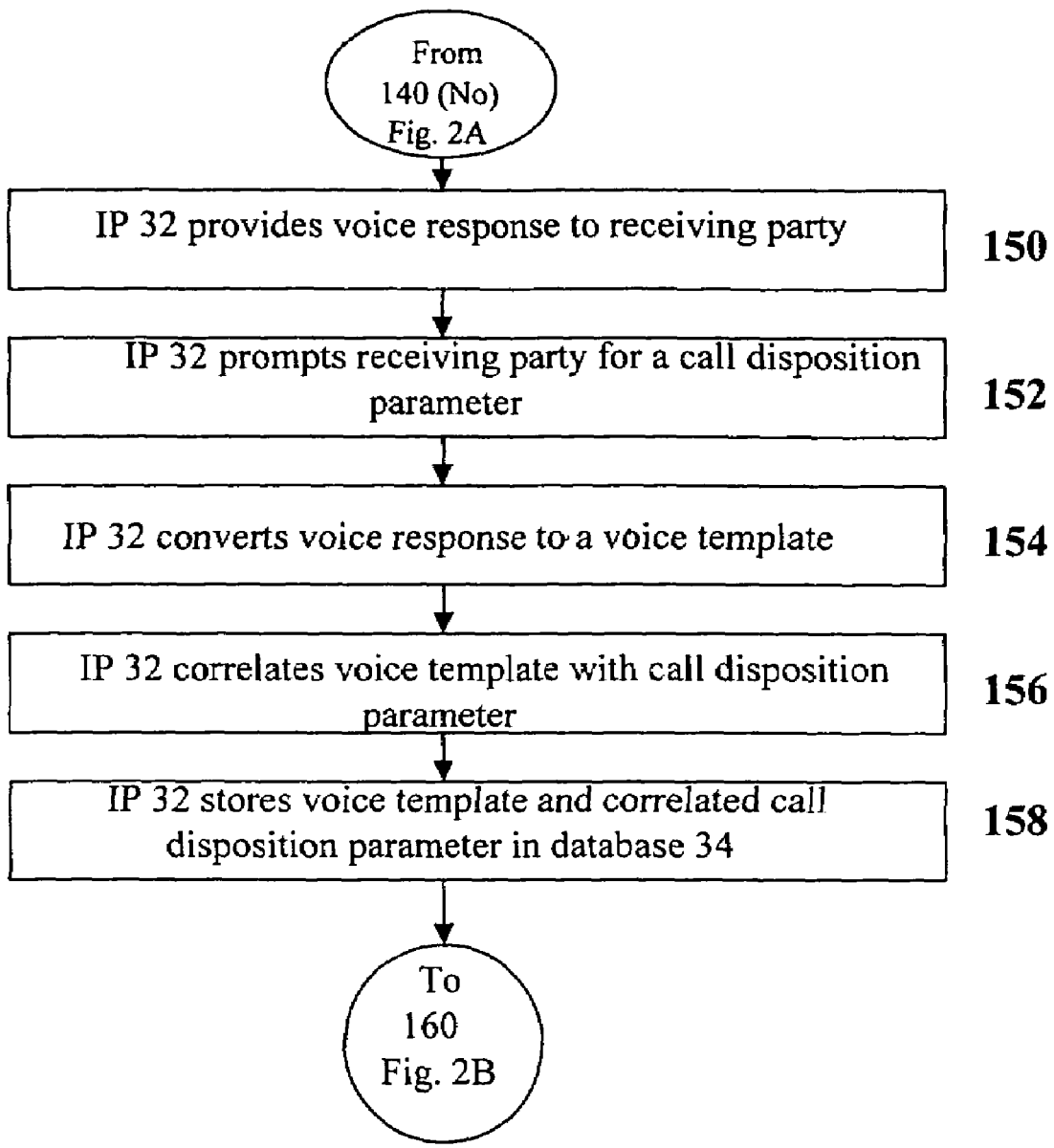

METHODS AND SYSTEMS FOR ROUTING A CALL

REFERENCE TO RELATED APPLICATIONS

This is continuation of prior U.S. patent application Ser. No. 10/366,013, filed Feb. 13, 2003 now U.S. Pat. No. 6,914,966, titled "METHODS AND SYSTEMS FOR ROUTING A CALL," which is related to U.S. patent application Ser. No. 09/823,997 filed on Apr. 3, 2001, issued on Mar. 9, 2004, as U.S. Pat. No. 6,704,405, titled "PERSONALIZED DIAL TONE SERVICE WITH PERSONALIZED CALL WAITING," and U.S. patent application Ser. No. 10/124,659 filed on Apr. 17, 2002, issued on Dec. 7, 2004, as U.S. Pat. No. 6,829,332, titled "PERSONALIZED DIAL TONE SERVICE WITH PERSONALIZED CALL WAITING".

BACKGROUND (1) Field

The present disclosure relates to schemes for routing a call using caller identification.

(2) Description of Prior Art

A variety of schemes for routing a call and determining the identity of a calling party are presently available. Many of these schemes determine the identity of the calling party based on a telephone number from which the call originated.

One caller identification scheme known as "caller ID" is an example of a scheme that can determine the identity of a calling party. In one implementation, caller ID can identify a telephone number associated with the telephone line or calling device used by a calling party and can provide the telephone number to a display device located at a receiving party's premises.

Another caller identification scheme known as "caller ID deluxe" is also an example of a scheme that can determine the identity of a calling party. In one implementation, caller ID deluxe can identify a calling party's telephone number and can use intelligent call processing to determine the name of the customer who pays for telephone service to be provided to the telephone number. Caller ID deluxe can provide both the telephone number and the customer name to a device located at the receiving party's premises.

Caller ID and caller ID deluxe can thus determine the identity of a calling party based on the telephone number from which the call originated. Caller ID and caller ID deluxe cannot, however, determine the actual identity of a calling party because different individuals may place calls from the same telephone number. For example, a parent may pay for telephone service to be provided to a telephone number that may be used by both the parent and the parent's children. Since the parent's name will be the customer name associated with the telephone number, a receiving party who receives a call from the telephone number will not know whether a parent or a child made the call, regardless of whether the receiving party subscribes to caller ID or caller ID deluxe.

Schemes such as caller ID and caller ID deluxe thus do not permit the actual identity of a calling party to be determined independent of, the telephone number from which a call originated, thereby inhibiting their utility.

SUMMARY

Schemes for routing a call using caller identification are described herein. These schemes are termed "real caller ID" and can be capable of determining the identity of a calling party independent of a telephone number from which the call originated.

Methods of routing a call from a calling party to a receiving party are described herein.

According to one exemplary embodiment, a method of routing a call may include accessing a database containing a plurality of voice templates of prior calling parties. Each voice template may have correlated therewith a call disposition parameter defined by the receiving party. Next, a voice response from the calling party may be compared with one of the plurality of voice templates stored in the database. Subsequently, the call may be routed to the receiving party based on a match between the voice response and the one of the plurality of voice templates.

In one aspect of the exemplary embodiment, routing may further include determining whether the call disposition parameter correlated with the one of the plurality of voice templates includes a call acceptance parameter.

In another aspect of the exemplary embodiment, routing may further include determining whether the call disposition parameter correlated with the one of the plurality of voice templates includes a call rejection parameter; and, routing the call to an interactive voice response system based on the call rejection parameter.

In another aspect of the exemplary embodiment, the database may include a prior stored voice template associated with the calling party. Routing may further include determining the identity of the calling party using the prior stored voice template associated with the calling party; and, providing the identity of the calling party to the receiving party. Providing may further include providing at least one of the voice response, a ringing signal representing the voice response matches the one of the plurality of voice templates, and data representing the identity of the calling party.

In another aspect of the exemplary embodiment, routing may further include updating a stored voice template associated with the calling party based on a match between the voice response and the stored voice template associated with the calling party.

In another aspect of the exemplary embodiment, routing may further include, for the voice response that does not match a stored voice template, providing the voice response to the receiving party; allowing the receiving party to define the call disposition parameter; and, determining whether the call disposition parameter includes a call acceptance parameter. Routing may further include converting the voice response from the calling party to a calling party voice template; correlating the call disposition parameter with the calling party voice template; and, storing the calling party voice template having the call disposition parameter correlated thereto in the database.

According to another exemplary embodiment, a method of routing a call may include accessing a database containing a plurality data files of prior calling parties, each data file having correlated therewith a call disposition parameter defined by the receiving party; comparing information identifying the calling party with one of the plurality of data files; and, routing the call to the receiving party based on a match between the information identifying the calling party and the one of the plurality of data files.

In one aspect of the exemplary embodiment, the plurality of data files may include at least one of: voice templates, data representing identities, and data representing local links of prior calling parties.

In another aspect of the exemplary embodiment, comparing information identifying the calling party with the one of the plurality of data files stored in the database may further include comparing at least one of a voice response from the calling party, data representing the identity of the calling party, and data representing the local link of the calling party with the one of the plurality of data files.

A method of generating a database for routing a call from a calling party to a receiving party is also described herein. According to one exemplary embodiment, a method of generating a database for routing a call from a calling party to a receiving party may include providing a voice response from the calling party to the receiving party; allowing the receiving party to define a call disposition parameter; correlating the call disposition parameter with the voice response; and, storing the voice response having the call disposition parameter correlated thereto in a database.

In one aspect of the exemplary embodiment, correlating may further include converting the voice response from the calling party to a voice template; and, correlating the call disposition parameter with the voice template.

In another aspect of the exemplary embodiment, storing may further include storing the voice template in the database.

According to another exemplary embodiment, the method may further include allowing the receiving party to modify the call disposition parameter correlated with the stored voice response.

A processor program stored on a processor-readable medium and including instructions to cause the processor to route a call from a calling party to a receiving party is also described herein. According to one exemplary embodiment, the processor program may include instructions to cause a processor to access a database containing a plurality of voice templates of prior calling parties, in which each voice template may have correlated therewith a call disposition parameter defined by the receiving party; compare a voice response from the calling party with one of the plurality of voice templates stored in the database; and, route the call to the receiving party based on a match between the voice response and the one of the plurality of voice templates.

A system for routing a call from a calling party to a receiving party is also described herein. According to one exemplary embodiment, the system may include a communications network for routing the call; a database containing a plurality of voice templates of prior calling parties, each voice template having correlated therewith a call disposition parameter defined by the receiving party, the database further being coupled to the communications network; and, an intelligent peripheral coupled to the communications network. The intelligent peripheral may include a comparator for accessing the database and comparing a voice response from the calling party with one of the plurality of voice templates. The intelligent peripheral may also include a router for generating an instruction to the communications network to route the call to the receiving party based on a match between the voice response and a selected one of the plurality of voice templates.

BRIEF DESCRIPTION OF THE DRAWINGS

FIGS. 2A, 2B, and 2C are flow charts illustrating a method for routing a call in accordance with an exemplary embodiment of the present invention.

DETAILED DESCRIPTION

Figure 1:
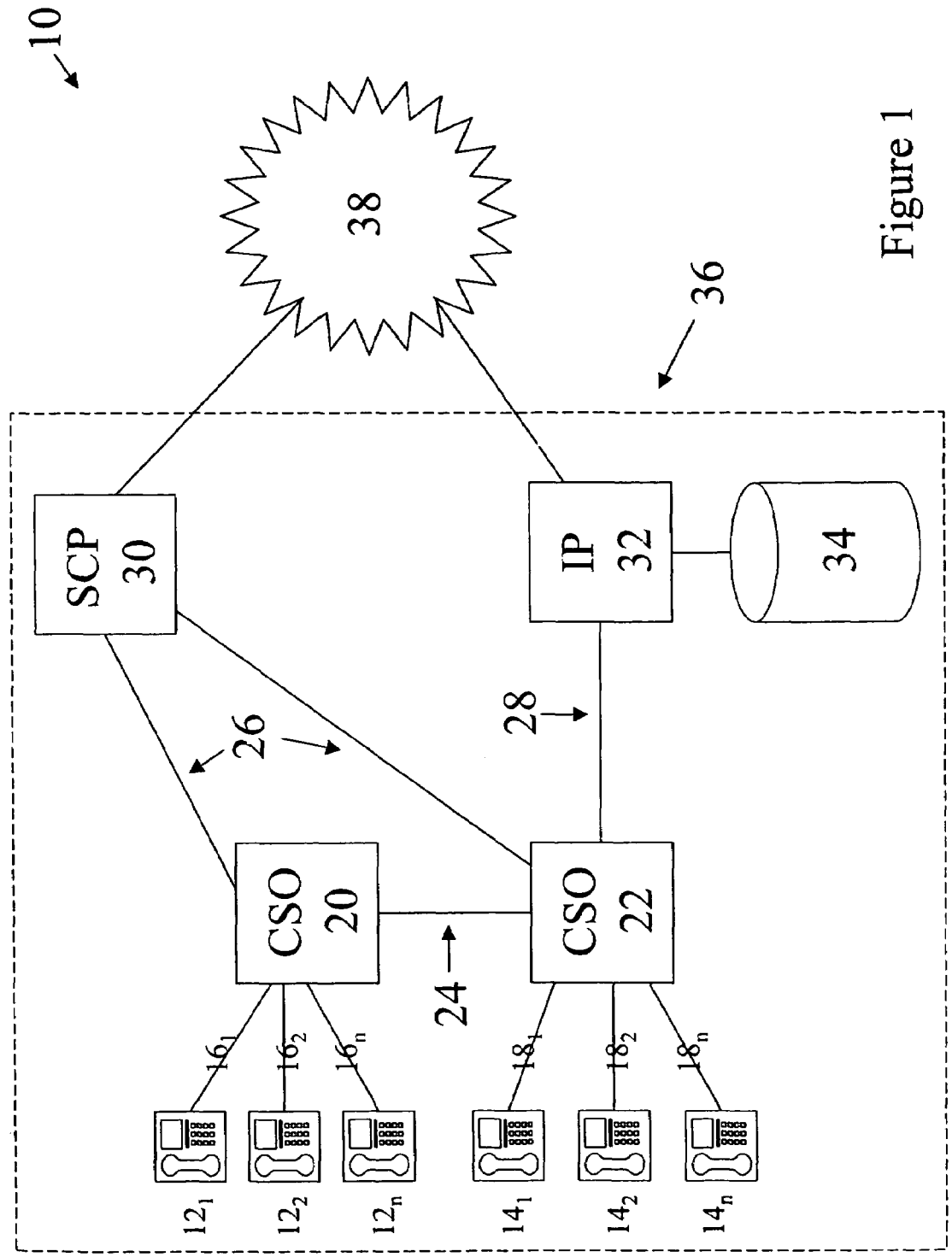
FIG. 1 illustrates a system for routing a call in accordance with an exemplary embodiment of the present invention.

A variety of acronyms are used in the following detailed description. For reference, these acronyms and their meanings are reproduced here.
  AIN: Automated Intelligent Network
  ASR: Automatic Speech Recognition
  CCIS: Common Channel Interoffice Signaling
  CIVR: Configuration Interactive Voice Response
  CSO: Central Switching Office
  DTMF: Dial Tone Modulation Frequency
  HTTP: HyperText Transfer Protocol
  IP: Intelligent Peripheral
  InP: Internet Protocol
  ISDN: Integrated Services Digital Network
  IVR: Interactive Voice Response
  OE: Office Equipment
  PC: Personal Computer
  PDA: Personal Digital Assistant
  PSTN: Public Switched Telephone Network
  RIVR: Registration Interactive Voice Response
  SCP: Service Control Point
  SIP: Session Initiation Protocol
  SIV: Speaker Identification and Verification
  SR: Speech Recognition
  SS7: Signaling System 7
  TAT: Termination Attempt Trigger
  TCP/IP: Transfer Control Protocol/Internet Protocol
  TTS: Text-to-Speech
  VoIP: Voice over Internet Protocol
  VoN: Voice on the Net
  WAP: Wireless Access Protocol Certain exemplary embodiments will now be described to provide an overall understanding of the schemes for routing a call described herein. One or more examples of the exemplary embodiments are shown in the drawings. Those of ordinary skill in the art will understand that the schemes for routing a call described herein can be adapted and modified to provide devices, methods, schemes, and systems for other applications, and that other additions and modifications can be made to the schemes described herein without departing from the scope of the present disclosure. For example, components, features, modules, and/or aspects of the exemplary embodiments can be combined, separated, interchanged, and/or rearranged to generate other embodiments. Such modifications and variations are intended to be included within the scope of the present disclosure.

FIG. 1 illustrates a system 10 for routing a call from a calling party to a receiving party in accordance with an exemplary embodiment of the present invention. The shown exemplary embodiment implements a so-called "real caller ID service" for determining the identity of the calling party independent of a telephone number from which the call originated. As shown in FIG. 1, the system 10 may include calling devices $12_{1, 2, \ldots, n}$, $14_{1, 2, \ldots, n}$, central switching offices (CSO) 20, 22, a service control point (SCP) 30, an intelligent peripheral (IP) 32, and a database 34 connected to a first communications network 36. The first network 36 may include communications links $16_{1, 2, \ldots, n}$, $18_{1, 2, \ldots, n}$, 24, 26, and 28. The SCP 30 and the IP 32 can also be connected to a second communications network 38. In addition, a calling device and a connected link may be associated with a party to a call. For example, in one embodiment, calling device $12_2$ and connected link $16_2$ may be associated with a calling party, and calling device $14_1$ and link $18_1$ may be associated with a receiving party.

A variety of conventional networks may be used to implement the first network 36. In one embodiment, the first network 36 may include the conventional Public Switched Telephone Network (PSTN). In this embodiment, the first network 36 may process a call according to a scheme similar to Automated Intelligent Network (AIN) call processing. Details of AIN call processing may be found in U.S. Pat. No. 6,122,357 to Farris et al., the contents of which patent are expressly incorporated by reference herein.

The calling devices $12_{1, 2, \ldots, n}$, $14_{1, 2, \ldots, n}$ may include a conventional analog telephone or a conventional digital telephone. The calling devices $12_{1, 2, \ldots, n}$, $14_{1, 2, \ldots, n}$ may also include a telephone based on a wireless system, for example, a cellular telephone, or a telephone based on a satellite system. The calling devices $12_{1, 2, \ldots, n}$, $14_{1, 2, \ldots, n}$ may include a conventional so-called smart phone, such as a personal computer (PC) phone, a Session Initiation Protocol (SIP) phone, and a phone based on the call control standard commonly referred to as H323, which can all process signals based on voice and/or Dial Tone Modulation Frequency (DTMF) tones. Calling devices 12, 14 may also include a Wireless Access Protocol (WAP) client, such as a cellular telephone, a Personal Digital Assistant (PDA), and a HyperText Transfer Protocol (HTTP) client, such as an Internet browser, which can process signals based on text.

As shown in FIG. 1, the calling devices $12_{1, 2, \ldots, n}$, $14_{1, 2, \ldots, n}$ may be connected to the PSTN 36 over links $16_{1, 2, \ldots, n}$, $18_{1, 2, \ldots, n}$, respectively. The links $16_{1, 2, \ldots, n}$, $18_{1, 2, \ldots, n}$ may include a conventional telephone line, a cable television line, a Digital Subscriber Line (DSL), an Integrated Services Digital Network (ISDN) line, and/or another conventional communications line. The calling devices $12_{1, 2, \ldots, n}$, $14_{1, 2, \ldots, n}$ may also be connected to the PSTN 36 through an intermediary. For example, the calling devices $12_{1, 2, \ldots, n}$, $14_{1, 2, \ldots, n}$ may be connected to the PSTN 36 via a base station and a switch, such as a base station and a switch for a cellular telephone.

The PSTN 36 may route a call over a network that includes various CSOs 20, 22 and links $16_{1, 2, \ldots, n}$, $18_{1, 2, \ldots, n}$, and 24. A CSO 20, 22 may include a conventional programmable digital switch. For example, a CSO 20, 22 may include a switch similar to or the same as the 5ESS-type switch manufactured by AT&T. A CSO 20, 22 may also include a switch similar to or the same as a switch manufactured by Northern Telecom and Seimens. The link 24 may include a conventional trunk line.

The PSTN 36 may include originating and terminating CSOs 20, 22 providing switched communications to local links $16_{1, 2, \ldots, n}$, $18_{1, 2, \ldots, n}$ connected to calling devices $12_{1, 2, \ldots, n}$, $14_{1, 2, \ldots, n}$, respectively. More generally, the PSTN 36 may include any number of CSOs and communications links sufficient to route a call from a calling party $12_{1, 2, \ldots, n}$ to a receiving party $14_{1, 2, \ldots, n}$. Additionally, the PSTN 36 may include a Common Channel Interoffice Signaling (CCIS) network for carrying a variety of signaling messages relating to instructions for call processing and other call disposition functions. Also, the PSTN 36 may operate in accord with a conventional signaling protocol, e.g. the signaling protocol commonly known as Signaling System 7 (SS7).

As shown in FIG. 1, the CSOs 20, 22 may be connected to the SCP 30 over links 26. Generally, the SCP 30 may provide the CSOs 20, 22 and the IP 32 with AIN instructions for call routing and call processing. The SCP 30 may include a database of call processing instructions and other information, such as information concerning the location of the IP 32 and other devices. In an alternate embodiment, the system 10 may be designed to permit the IP 32 to provide the CSOs 20, 22 with AIN instructions for call processing and call routing.

As shown in FIG. 1, the SCP 30 may be directly connected over communications links 26 to a plurality of CSOs 20, 22. Alternately, the SCP 30 may be directly connected over a communication link 26 to a single CSO. The links 26 may include conventional CCIS/SS7 links. In one embodiment, the SCP 30 may include a general purpose programmable processor running a database application.

As shown in FIG. 1, the terminating CSO 22 may be connected to the IP 32 over link 28. The IP 32 may perform a variety of call processing functions. For example, the IP 32 may include a general purpose programmable processor capable of performing dialed digit collection, DTMF tone signal reception, speaker identification and verification (SIV), speech recognition (SR), text-to-speech (TTS) synthesis, and other functions. Generally, the IP 32 may be capable of receiving and processing a voice input and a DTMF tone signal. As explained below, the IP 32 may determine the identity of the calling party by interacting with the calling party, the SCP 30, and the database 34.

The IP 32 may include a single processing module or a plurality of interconnected processing modules. For example, the IP 32 may include a conventional TTS synthesis module for converting a textual representation into a voice output; a conventional automatic SR (ASR) module for converting a voice input into a textual representation; a SIV module or comparator for accessing the database 34 and comparing a voice response from the calling party with a voice template stored in the database 34; and, a router for generating an instruction to the first network or PSTN 36 for routing the call.

As shown in FIG. 1, the IP 32 may be directly connected over link 28 to a single CSO 22. Alternately, the IP 32 may be directly connected over links 28 to a plurality of CSOs. The link 28 may include a combination of a digital link capable of providing two-way voice-grade-type telephone communications and a signaling channel capable of transporting signaling messages in two directions. In one embodiment, the link 28 may include a combination of a T1 line and a simplified message desk interface (SMDI) link. Alternately, the link 28 may include a primary rate interface (PRI) type ISDN line. The IP 32 may be constructed according to a scheme similar to that described in U.S. Pat. No. 5,572,583 to Wheeler, Jr., et al., the contents of which patent are expressly incorporated by reference herein.

As shown in FIG. 1, the SCP 30 and the IP 32 may be connected to each other over the PSTN 36. The SCP 30 and the IP 32 may interact over the PSTN 36 according to a conventional 1129 protocol. In addition, the SCP 30 and the IP 32 may be connected to each other over the second network 38. The second network 38 may be a conventional signaling network, such as a network based on Transfer Control Protocol/Internet Protocol (TCP/IP). The SCP 30 and the IP 32 may communicate over the TCP/IP network 38 using a conventional 1129+ protocol or a generic data interface (GDI) protocol.

As shown in FIG. 1, the IP 32 may be connected to a database 34. As explained below, the database 34 may store voice templates of prior calling parties. In an alternate embodiment, the system 10 may be designed to permit the IP 32 to store the voice templates in internal memory.

Operation of the real caller ID service embodied in FIG. 1 can be based on a conventional SIV scheme that manipulates the voice templates stored in the database 34. In general, a voice template may include a numeric parameter that quantifies a biometric characteristic of a calling party's voice. A voice template may be generated from a voice response from a calling party according to a SIV scheme that may be similar to the conventional SIV scheme described in U.S. Pat. No. 6,356,868 to Yuschik et al., the contents of which patent are expressly incorporated by reference herein. Like a fingerprint, a voice template can be a unique identifier of a calling party. As such, a voice template may be well suited for use with the real caller ID service described herein.

A variety of voice inputs may be used by the system 10 to generate a voice template. As described below, the voice template may be generated based on a voice response of the calling party to a challenge, such as "Please state your name." The voice templates in the database 34 can also be associated with data to facilitate subsequent identification of a calling party. For example, a voice template may be associated with a textual representation of the voice response used to generate the voice template. The textual representation may be generated based on a SR scheme that may be similar to the conventional SR scheme described in U.S. Pat. No. 6,101,468 to Gould et al., the contents of which patent are expressly incorporated by reference herein.

As described below, the real caller ID service may permit the receiving party to define a rule for disposing an incoming call based on the identity of the calling party. To facilitate subsequent call disposition, the voice templates in the database 34 may thus be associated with data that uniquely identify the receiving party.

A variety of schemes are available for uniquely associating a voice template with a particular receiving party. The voice template may be associated with information identifying the local link $18_{1, 2, \ldots, n}$ of the receiving party. For example, the voice template may be associated with the telephone number or dialed digits corresponding to the local link $18_{1, 2, \ldots, n}$ of the receiving party. Alternately, the voice template may be associated with an office equipment (OE) number corresponding to the local link $18_{1, 2, \ldots, n}$ of the receiving party. Details of OE numbers may be found in the '357 patent to Farris et al. previously incorporated by reference herein.

Additionally, the voice template may be associated with information identifying the local line $16_{1, 2, \ldots, n}$ of the calling party. Such information may include the telephone number or the OE number corresponding to the local link $16_{1, 2, \ldots, n}$ of the calling party.

An exemplary method of routing a call using the real caller ID service may now be understood in the following manner with reference to FIG. 1. Consider a call placed by a calling party $12_2$ to a receiving party $14_1$ who subscribes to the real caller ID service. The call may be transmitted from the calling device $12_2$ over link $16_2$ to an originating CSO 20. The originating CSO 20 may route the call over link 24 to a terminating CSO 22 that provides switched communications to link $18_1$. As shown in FIG. 1, the terminating CSO 22 may provide switched communications to a plurality of links $18_{1, 2, \ldots, n}$, at least one of which may be associated with a subscriber to the real caller ID service.

During AIN processing, the CSO 22 may detect a call to the communication link $18_1$ of the receiving party $14_1$ who subscribes to the real caller ID service. At this point, AIN processing of the call may hit a termination attempt trigger (TAT). Based on the TAT, the CSO 22 may suspend the call and transmit a query to the SCP 30 asking for a call processing instruction. The CSO 22 may provide the SCP 30 with call processing information, such as the digits dialed by the calling party and/or the telephone number of the originating call. The SCP 30 may then determine whether further call processing should be performed by the IP 32. Subsequently, the SCP 30 may provide an instruction to the CSO 22 to route the call to the IP 32 to determine the identity of the calling party. The CSO 22 may then connect the call between the calling party and the IP 32. During this process, the CSO 22 may provide the IP 32 with call processing information, such as the dialed digits and/or the telephone number of the originating call.

The IP 32 may determine the identity of the calling party by interacting with the calling party, the SCP 30, and the database 34 via a request-response scheme throughout the duration of call processing. Upon receipt of the call, the IP 32 may query the SCP 30 for a call processing instruction. In one embodiment, the SCP 30 may instruct the IP 32 to prompt the calling party for a voice response by playing a challenge, such as "Please state your name." Subsequently, the IP 32 may retrieve the challenge, in the form of a pre-recorded textual message, from internal memory and/or from the database 34, synthesize the challenge into a voice output using a TTS synthesizer module, and play the challenge to the calling party. Upon receiving the voice response from the calling party, or waiting for a sufficient amount of time in which to receive the voice response, the IP 32 may again query the SCP 30 for a call processing instruction. The SCP 30 may further instruct the IP 32 to compare the voice response to the voice templates stored in the database 34 in order to determine the identity of the calling party.

In another embodiment, the SCP 30 may instruct the IP 32 to execute a script-type application stored in the internal memory of the IP 32 and/or in the database 34. The IP 32 and/or the database 34 may include a variety of script-type applications, such as a script-type application for determining the identity of the calling party, a script-type application for executing an interactive voice response (IVR) system, and script-type applications for performing other functions.

As previously indicated, the voice templates stored in the database 34 may be associated with data that uniquely identify the receiving party. As such, to determine the identity of the calling party, the IP 32 may access from the database 34 the voice templates corresponding to the receiving party $14_1$. The IP 32 may also convert the voice response from the receiving party to a voice template for comparison. The IP 32 may then compare the voice response from the calling party to the voice templates. The IP 32 may compare the voice response and the voice templates based on a conventional SIV scheme, such as the SIV scheme described in the '868 patent to Yuschik et al. previously incorporated by reference herein.

Since a voice template can be a unique identifier of a calling party, the IP 32 may determine the identity of a calling party based on a match between the voice response from the calling party and a voice template. Specifically, the IP 32 may determine the identity of the calling party to be the identity of the prior calling party associated with the matching voice template.

A variety of schemes may be utilized to enhance the reliability of the real caller ID service described herein. For example, the real caller ID service may implement an updating scheme for updating a voice template, similar to the updating scheme described in the '868 patent to Yuschik et al. previously incorporated by reference herein. Generally, a stored voice template associated with a prior calling party may be updated based on a match between the voice template and a voice response from the calling party. Updating the voice template over time may allow the voice template to include variations in the voice of the calling party. Variations may arise from changes in the age or health of the calling party, changes in the atmospheric conditions during a call, changes in the quality of voice communications during a call, and/or other factors.

The IP 32 can also compare the voice response from the calling party to the textual representation associated with the voice template. The IP 32 may perform this comparison based on a conventional SR scheme, such as the SR scheme described in the '468 patent to Gould et al. previously incorporated by reference herein. In one embodiment, a SR comparison may be performed before a SIV comparison to reduce the number of voice templates against which to perform the SIV comparison. More generally, a SR comparison may be performed before and/or during and/or after a SIV comparison to enhance the reliability of the caller identification process.

The IP 32 can also compare the voice response from the calling party to the calling party local link information associated with the voice template. For example, the IP 32 can compare the telephone number of the originating call with the telephone number of the prior calling party associated with the voice template. In one embodiment, a telephone number comparison may be performed before a SIV comparison to reduce the number of voice templates against which to perform the SIV comparison. More generally, a telephone number comparison may be performed before and/or during and/or after a SIV comparison to enhance the reliability of the caller identification process.

A variety of scenarios are available for routing the call subsequent to determining the identity of the calling party. Generally, the SCP 30 and/or the IP 32 may be provided with at least one rule for routing the call based on a match between the voice response from the calling party and a voice template in the database 34. In one embodiment, the SCP 30 and/or the IP 32 may be provided with default call disposition rules. In another embodiment, the SCP 30 and/or the IP 32 may allow the receiving party to define the call disposition rules. A brief survey of exemplary call disposition rules is provided below.

As previously indicated, the SCP 30 and/or the IP 32 may be provided with default call disposition rules. In one embodiment, the SCP 30 and/or the IP 32 may be provided with two simple default rules for routing the call to the receiving party as a result of identifying a match between the voice response from the calling party and a stored voice template. According to a first default rule, if the IP 32 identifies a match, then the IP 32 may route the call to the receiving party 14$_1$. According to a second default rule, if the IP 32 does not identify a match, then the IP 32 may instruct the CSO 22 to drop the call. Alternately, the IP 32 may execute a script-type application for an IVR system, such as a conventional voicemail system.

According to the first default rule in this embodiment, if the IP 32 identifies a match, then the IP 32 may provide an instruction to the terminating CSO 22 to route the call to the receiving party 14$_1$. The IP 32 may supply the dialed digits and/or the destination telephone number to the CSO 22. Subsequently, the CSO 22 may route the call to the receiving party 14$_1$, and tear down the connection between the calling party and the IP 32.

According to the second default rule in this embodiment, if the IP 32 does not identify a match, then the IP 32 may execute a script-type application for disposing of the call. For example, the IP 32 may execute an application for an IVR system. The application may be an application for a conventional voicemail system in which the IP 32 prompts the calling party to leave a message for the receiving party. Also, the IP 32 may play a pre-recorded rejection message to the calling party. The IP 32 may synthesize this message according to previously described schemes. Subsequently, the IP 32 may instruct the CSO 22 to tear down the call.

Regardless of the call disposition rule, whether defined by default or by the receiving party, the IP 32 may provide the identity of the calling party to the receiving party. A variety of schemes are available for providing the identity of the calling party to the receiving party. In one embodiment, the IP 32 may play the voice response of the calling party to the receiving party. In such an embodiment, the IP 32 may instruct the CSO 22 to connect the IP 32 and the receiving party so that the IP 32 may play the voice response of the calling party to the receiving party. In another embodiment, the IP 32 may convert a textual representation of the identity of the calling party to a voice output according to previously described schemes. In such an embodiment, the IP 32 may play the synthesized identity of the calling party to the receiving party. In another embodiment, the IP 32 may instruct the first network 36 to route a textual representation of the identity of the calling party and/or the telephone number of the originating call to the receiving party. In such an embodiment, the first network 36 may route the textual representation to a caller identification terminal according to a conventional scheme. In another embodiment, the IP 32 may instruct the CSO 22 to ring the calling device 14$_1$ with a ring sequence representing an identified calling party. Additionally, the IP 32 may provide the identity of the calling party to the receiving party according to a combination of at least two of the previously described schemes.

As previously indicated, the real caller ID service may permit the receiving party to define a call disposition rule for routing an incoming call based on the identity of the calling party. In one embodiment, the receiving party may define a call disposition parameter for a voice template stored in the database 34. More specifically, for a particular voice template, the receiving party may define a call disposition parameter that includes one of a call acceptance parameter and a call rejection parameter. The call disposition parameter may be correlated with the particular stored voice template according to schemes described below.

In such an embodiment, the IP 32 may route a call by first comparing the voice response from the calling party with the voice templates stored in the database 34. Upon identifying a matching voice template for the voice response, the IP 32 may evaluate the call disposition parameter correlated with the matching voice template. If the IP 32 determines that the call disposition parameter includes a call acceptance parameter, then the IP 32 may route the call to the receiving party according to previously described schemes. If the IP 32 determines that the call disposition parameter includes a call rejection parameter, however, then the IP 32 may dispose of the call according to previously described schemes. For example, the IP 32 may execute a script-type application for an IVR system, such as a conventional voicemail system. Such an embodiment may thus permit the receiving party to screen incoming calls based on the identity of the calling party.

In the foregoing call disposition scheme, the IP 32 may route the call based on identifying a matching voice template for the voice response from the calling party. During an initial call between a calling party and a receiving party, however, the IP 32 may not be able to identify a matching voice template. A variety of schemes are available for disposing of a call which has an unmatched voice response.

In one embodiment, if the IP 32 cannot identify a matching voice template, the IP 32 may generate a new voice template based on the voice response from the calling party, and may include the new voice template in the database 34. In this embodiment, the database 34 may be supplemented with voice templates that correspond to new calling parties.

In another embodiment, if the IP 32 cannot identify a matching voice template, the IP 32 may provide the receiving party with an opportunity to supplement the database 34. In this embodiment, the IP 32 may provide the unmatched voice response to the receiving party. For example, the IP 32 may instruct the CSO 22 to ring the calling device 14$_1$ with a ring sequence representing a first time calling party, and then the IP 32 may play the unmatched voice response to the receiving party. Subsequently, the IP 32 may prompt the receiving party to provide a call disposition parameter to be correlated with the voice response.

The receiving party may provide a call disposition parameter to the IP 32 by depressing a key on the calling device 14$_1$ or by responding with a voice input. In one embodiment, the receiving party may depress a particular key or set of keys to correlate the voice response with a call acceptance parameter and a call rejection parameter. For example, the calling party may depress a "1" key and a "2" key to indicate a call acceptance parameter and a call rejection parameter, respectively.

Upon receiving the call disposition parameter defined by the receiving party, the IP 32 may convert the voice response to a voice template, correlate the call disposition parameter with the voice template, and store the voice template and the correlated call disposition parameter in the database 34. The IP 32 may associate the voice template with the receiving party according to previously described schemes.

As previously indicated, the IP 32 may be designed to execute a script-type application for a conventional IVR system. A conventional IVR system may include at least one pre-recorded message for prompting a party to a call to take a particular action. The IP 32 may include script-type applications for a variety of IVR systems. For example, in one embodiment, as previously described, the IP 32 may execute an application for a IVR voicemail system that may be similar to the conventional IVR voicemail system described in U.S. Pat. No. 6,347,134 to Sherwood et al., the contents of which patent are expressly incorporated by reference herein.

The IP 32 may execute an application for a configuration IVR (CIVR) system that allows a subscriber to the real caller ID service to manipulate the voice templates stored in the database 34. A subscriber to the real caller ID service may access the CIVR system according to a conventional call routing scheme. For example, a subscriber may access the CIVR system by dialing a telephone number associated with the CIVR system. On receipt of the call, the CSO 22 and the SCP 30 may route the call to the IP 32. The IP 32 may then execute an application for the CIVR system.

The CIVR system may present the subscriber with a variety of options for manipulating the voice templates stored in the database 34. In one embodiment, the CIVR system may allow the subscriber to modify a call disposition rule for routing an incoming call. For example, the CIVR system may allow the subscriber to review a stored voice template and modify a call disposition parameter correlated with the stored voice template. The subscriber may interact with the CIVR system based on a conventional DTMF scheme.

The IP 32 may execute an application for a registration IVR (RIVR) system that allows a likely calling party to generate a voice template for storage in the database 34. As previously indicated, the IP 32 may generate a voice template for a new calling party during call processing. The RIVR system may provide an alternate scheme for generating a voice template for a new calling party. In one embodiment, a subscriber to the real caller ID service may provide a likely calling party, such as a family member or a friend, with a telephone number associated with the RIVR system. The calling party may access the RIVR system by dialing the telephone number. On receipt of the call, the CSO 22 and the SCP 30 may route the call to the IP 32. The IP 32 may then execute an application for the RIVR system.

The RIVR system may prompt the calling party for a voice response by playing a challenge, such as "Please state your name." After receiving the voice response, the RIVR system may convert the voice response to a voice template, and store the voice template in the database 34. The RIVR system may associate the voice template with a textual representation of the voice response from the receiving party and/or a telephone number of the originating call. The RIVR system may also associate the template with the receiving party to facilitate subsequent retrieval. The RIVR system may implement a conventional training scheme to enhance the reliability of the voice template for subsequent caller identification. For example, the RIVR system may prompt the calling party to respond to the challenge several times to generate a more reliable voice template. By default, the RIVR system may correlate a call acceptance parameter with a new voice template. The calling party may interact with the RIVR system based on a conventional DTMF scheme.

The CIVR and RIVR systems may execute a conventional authentication scheme before permitting a user to modify and generate a voice template, respectively. For example, the CIVR and RIVR systems may prompt the user to provide identifying data, such as a username, a password, an account number, a telephone number, and/or other data, before providing access.

Figure 2A:
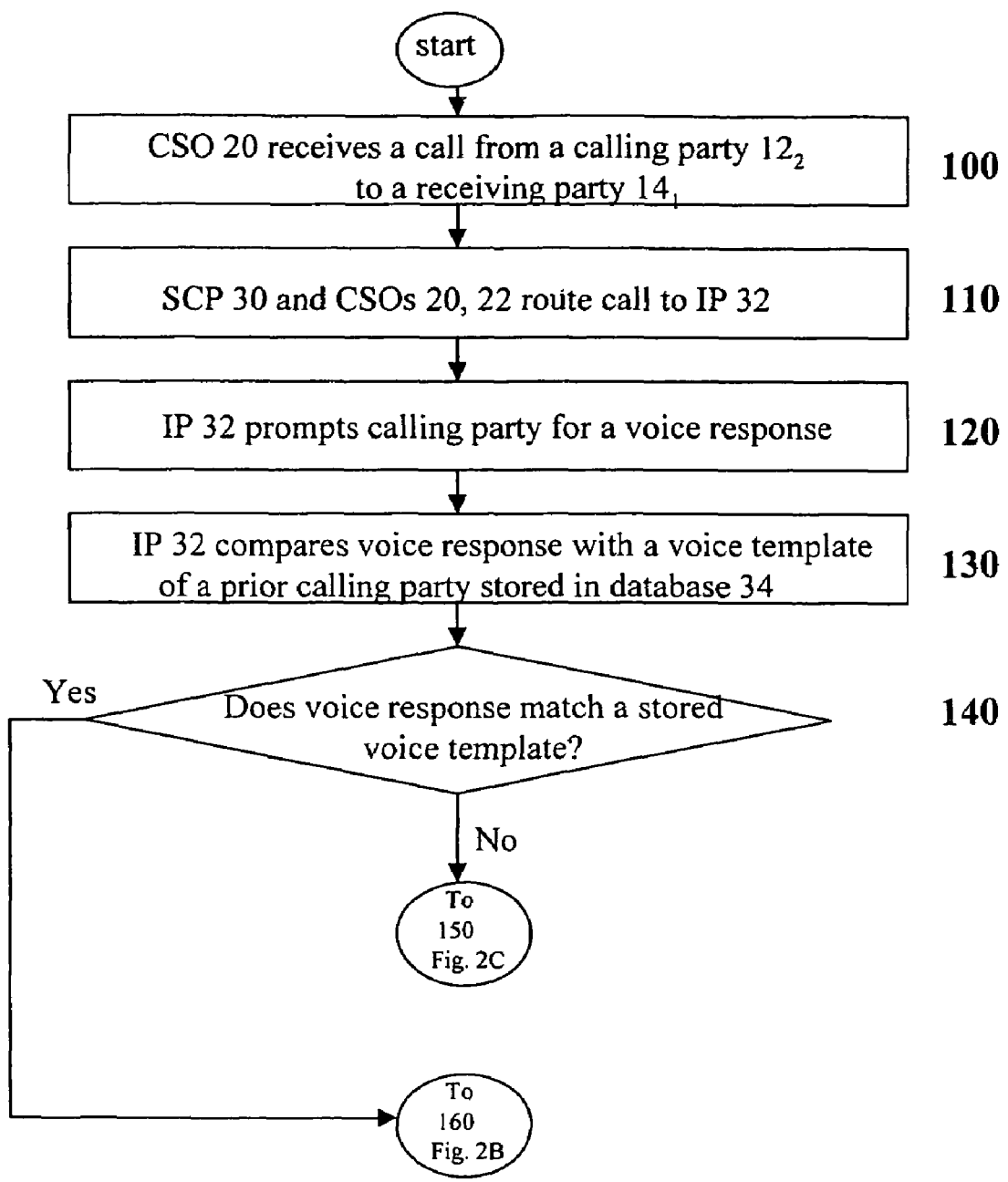
Figure 2B:
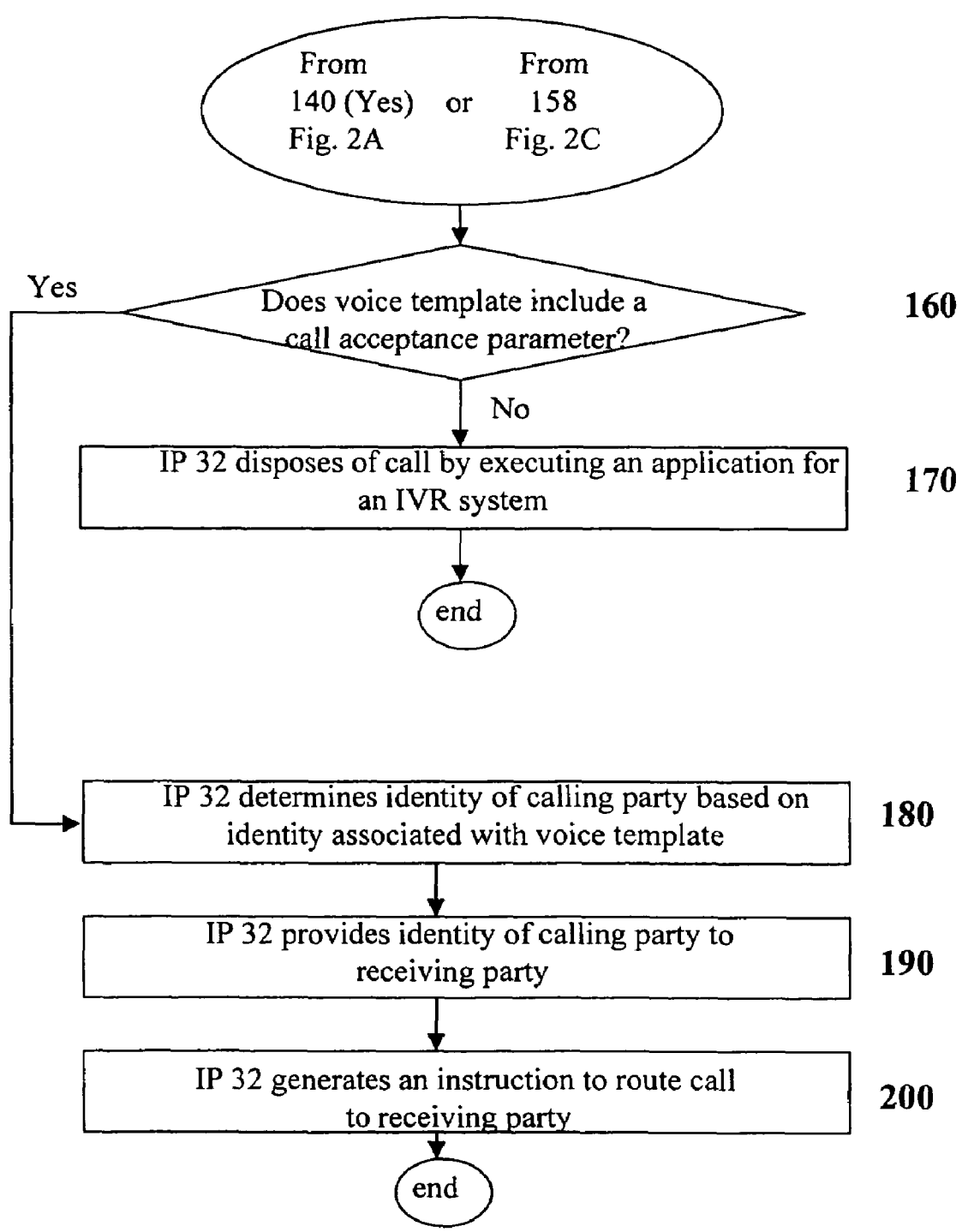

FIGS. 2A, 2B, and 2C are flowcharts illustrating a method for routing a call in accordance with an exemplary embodiment of the present invention. Operation of the system 10 shown in FIG. 1 may be understood in the following manner with reference to FIGS. 2A, 2B, and 2C. The CSO 20 may receive a call from a calling party, e.g. 12$_2$, to a receiving party, e.g. 14$_1$ (100 in FIG. 2A). The SCP 30 and CSOs 20, 22 may then route the call to IP 32 (110 in FIG. 2A). Next, the IP 32 may prompt the calling party for a voice response (120 in FIG. 2A). Upon receiving the voice response, the IP 32 may compare the voice response with a voice template of a prior calling party stored in database 34 (130 in FIG. 2A).

Subsequently, the IP 32 may determine whether the voice response matches a stored voice template (140 in FIG. 2A). If the IP 32 determines a match, the IP 32 may continue to process the call at 160 in FIG. 2B. If the IP 32 does not determine a match, however, the IP 32 may continue to process the call at 150 in FIG. 2C.

At 160 in FIG. 2B, the IP 32 may determine whether a call disposition parameter, correlated with the voice template includes a call acceptance parameter. If the IP 32 detects a call acceptance parameter, the IP may continue to process the call at 180 in FIG. 2B. If the IP 32 does not detect a call acceptance parameter, however, the IP 32 may continue to process the call at 170 in FIG. 2B.

At 180 in FIG. 2B, the IP 32 may determine the identity of the calling party based on the identity associated with the voice template. Next, the IP 32 may provide the identity of the calling party to the receiving party (190 in FIG. 2B).

Finally, the IP 32 may generate an instruction to the PSTN 36 to route the call to the receiving party (200 in FIG. 2B).

At 150 in FIG. 2C, the IP 32 may provide an unmatched voice response to the receiving party. Next, the IP 32 may prompt the receiving party for a call disposition parameter (152 in FIG. 2C). Thereafter, the IP 32 may convert the voice response to a voice template (154 in FIG. 2C), correlate the voice template with the received call disposition parameter (156 in FIG. 2C), and store the voice template and the call disposition parameter correlated thereto in the database 34 (158 in FIG. 2C). The IP 32 may continue to process the call at 160 in FIG. 2B.

At 170 in FIG. 2B, the IP 32 may dispose of the call by executing an application for an IVR system.

As previously indicated, the real caller ID service may route a call from a calling party to a receiving party and determine the identity of the calling party independent of a telephone number of the originating call. The real caller ID service may provide the identity of the calling party to the receiving party. The real caller ID service may also permit the receiving party to define a call disposition rule for disposing of an incoming call based on the identity of the calling party. The real caller ID service may perform these functions by utilizing an interface that can be transparent to the calling party and the receiving party.

The real caller ID service described herein may be adapted to a variety of practical applications. For example, the real caller ID service may be readily implemented in a business having an internal voicemail system. An internal voicemail system may associate a recorded version of an employee's name with an internal telephone number extension. In such an embodiment, the real caller ID system may utilize the recorded version of the employee's name to generate a voice template for subsequent caller identification. The real caller ID system may also allow a call disposition rule to be defined based on the telephone number extension of an employee. Such an embodiment may be implemented by suitably modifying the schemes described herein.

In another embodiment, the real caller ID system may be adapted to route a call from a speech-impaired individual. As previously indicated, the IP 32 may be capable of receiving and processing a voice input as well as a DTMF tone signal. As such, the real caller ID system may provide a speech-impaired individual with a DTMF-based access code for responding to the challenge from the IP 32. Upon receiving the access code, the IP 32 may route the call to the receiving party and instruct the CSO 22 to ring the calling device 14$_1$ with a ring sequence representing a speech-impaired calling party.

In another embodiment, the real caller ID system may allow a network administrator to act as a notary for guaranteeing the identity of a calling party. In such an embodiment, the network administrator may notarize a call by verifying a match between a voice response from the calling party and a voice template stored in the database 34.

In another embodiment, the real caller ID service may be adapted to route a call on a conventional Internet Protocol (InP) telephony channel. In such an embodiment, the calling devices 12$_{1, 2, \ldots, n}$, 14$_{1, 2, \ldots, n}$ may include a conventional so-called smart phone, such as a PC phone and a SIP phone. The public network commonly referred to as the Internet may receive and route the call to an InP telephony server. Alternately, a private network that restricts access by the public may receive and route the call to an InP telephony server. After receiving the call, the InP telephony server may process the call using Voice over Internet Protocol (VoIP), Voice on the Net (VoN), or another conventional protocol for transforming a voice response from the call into InP data. The InP telephony server may route the call to the SCP 30 and/or the IP 32 for subsequent AIN call processing. The InP telephony server may include a VoIP product similar to that of VocalTec Communications Ltd., Fort Lee, N.J. or a VoN product similar to that of Intel, Austin, Tex.

In another embodiment, the real caller ID service may be adapted to include an Internet-based interface. In such an embodiment, a subscriber to the real caller ID service may manipulate a voice template and define a call disposition rule over the Internet. Such an embodiment may be implemented by suitably modifying the schemes described herein.

Generally, the real caller ID service described herein may route a call from a calling party to a receiving party based on comparing information identifying the calling party with a data file of a prior calling party stored in a database. In one embodiment, as previously described, the information may include a voice response and the data file may include a voice template of a prior calling party. In another embodiment, the information may include data representing the identity of the calling party and the data file may include data representing the identity of a prior calling party. For example, the information may include a DTMF representation of a calling party identity. Alternately, the information may include a textual representation of a calling party identity, such as a textual representation generated based on a voice response. In another embodiment, the information may include data representing the local link of the calling party and the data file may include data representing the local link of a prior calling party. For example, the information may include the telephone number or OE number of the local link of the calling party. In another embodiment, the information may include at least one of a voice response, data representing an identity, and data representing a local link. The data file may be correlated with a call disposition parameter defined by the receiving party according to previously described schemes. The real caller ID service may route the call to the receiving party based on a match between information identifying the calling party and a data file stored in the database according to previously described schemes.

The schemes described herein are not limited to a particular hardware or software configuration; they may find applicability in many computing or processing environments. The schemes can be implemented in hardware or software, or in a combination of hardware and software. The schemes can be implemented in one or more computer programs, in which a computer program can be understood to include one or more processor-executable instructions. The computer program(s) can execute on one or more programmable processors, and can be stored on one or more storage media readable by the processor, including volatile and non-volatile memory and/or storage elements. The programmable processor(s) can access one or more input devices to obtain input data and one or more output devices to communicate output data.

The computer program(s) can be implemented in high level procedural or object oriented programming language to communicate with a computer system. The computer program(s) can also be implemented in assembly or machine language. The language can be compiled or interpreted.

The computer program(s) can be stored on a storage medium or a device (e.g., compact disk (CD), digital video disk (DVD), magnetic disk, internal hard drive, external hard drive, random access memory (RAM), redundant array of independent disks (RAID), or removable memory card) that is readable by a general or special purpose programmable computer for configuring and operating the computer when the storage medium or device is read by the computer to perform the schemes described herein.

While the schemes described herein have been particularly shown and described with reference to the exemplary embodiments thereof, those of ordinary skill in the art will understand that various changes may be made in the form and details described herein without departing from the spirit and scope of this disclosure. Those of ordinary skill in the art will recognize or be able to ascertain many equivalents to the exemplary embodiments described herein by using no more than routine experimentation. Such equivalents are intended to be encompassed by the scope of this disclosure and the appended claims.

The invention claimed is:

1. A method, comprising:
   receiving a request to connect a call from a calling party to a receiving party;
   accessing a database containing a plurality of voice templates of prior calling parties;
   comparing a voice response from the calling party with at least one of the plurality of voice templates stored in the database;
   routing the call to the receiving party;
   providing an identification of the calling party to the receiving party based on a match between the voice response and one of the plurality of voice templates, the identification including calling party information correlated with the voice template matched; and
   additionally providing an identification of the calling party to the receiving party based on no match between the voice response and any one of the plurality of voice templates, and thereafter:
      prompting the receiving party to provide a call acceptance or call rejection parameter to be correlated with the voice response,
      converting the voice response to a voice template,
      correlating the call acceptance or the call rejection parameter with the voice template, and
      storing the voice template and the correlated call acceptance or the correlated call rejection parameter in the database.

2. The method of claim 1, wherein the providing further includes:
   providing at least one of the voice response, a ringing signal representing the voice template matched, and data representing the identity of the calling party.

3. The method of claim 1, further comprising:
   updating the one of the plurality of voice template correlated with the calling party based on the voice response.

4. A machine-readable medium storing instructions executable by a processor, the instructions configured to cause the processor to perform the method of claim 1.

5. A method, comprising:
   receiving a request to connect a call from a calling party to a receiving party;
   comparing data representing an identity of the calling party to data representing an identity of a prior calling party stored in a database;
   when the data representing the identity of the calling party match the data representing the identity of the prior calling party, retrieving from the database calling party identification information correlated with the data representing the identity of the prior calling party;
   routing the call to the receiving party; and
   providing the receiving party with the calling party identification information; but
   when the data representing the identity of the calling party does not match the data representing of the identity of the prior calling party, providing an identification of the calling party to the receiving party based on no match between the voice response and any one of the plurality of voice templates, and thereafter:
      prompting the receiving party to provide a call acceptance or call rejection parameter to be correlated with a voice response from the calling party,
      converting the voice response to a voice template,
      correlating the call acceptance or the call rejection parameter with the voice template, and
      storing the voice template and the correlated call acceptance or correlated call rejection parameter in the database.

6. The method of claim 5, wherein the data representing the identity of the calling party includes a voice response, and the data representing the identity of the prior calling party includes a voice template.

7. The method of claim 6, wherein the data representing the identity of the calling party includes a telephone number of the calling party, and the data representing the identity of the prior calling party includes a telephone number of the prior calling party.

8. The method of claim 5, wherein the calling party identification information includes at least one of a textual representation of the identity of the prior calling party and a telephone number of the prior calling party.

9. The method of claim 5, wherein the data representing the identity of the calling party includes a numeric parameter that quantifies a biometric characteristic of the calling party, and the data representing the identity of the prior calling party includes a numeric parameter that quantifies a biometric characteristic of the prior calling party.

10. The method of claim 9, wherein the biometric characteristic of the calling party is a biometric characteristic of the calling party's voice.

11. The method of claim 5, further comprising:
    when the data representing the identity of the calling party match the data representing the identity of the prior calling party, retrieving from the database a call disposition parameter correlated with the data representing the identity of the prior calling party;
    wherein routing the call to the receiving party only occurs when the call disposition parameter indicates that the receiving party accepts the call.

12. The method of claim 11, further comprising:
    routing the call to a voicemail system when the call disposition parameter indicates that the receiving party rejects the call.

13. The method of claim 5, wherein routing the call to the receiving party only occurs when a call disposition parameter provided by the receiving party indicates that the receiving party accepts the call.

14. A machine-readable medium storing instructions executable by a processor, the instructions configured to cause the processor to perform the method of claim 5.

15. A system, comprising:
    a first processing unit, configured to
       receive a call from a calling party to a receiving party,
       receive a voice response from the calling party,
       compare the voice response to a database containing a plurality of stored voice templates,
       when the voice response matches one of the plurality of stored voice templates, provide a message to a second processing unit in communication with the first processing unit, the message including identification information of the calling party; but, when the voice response does not match any one of the plurality of stored voice templates, provide the identification information of the calling party to the receiving party and thereafter prompt the receiving party to provide a call acceptance or call rejection parameter to be correlated with the voice response, convert the voice response to a voice template, correlate the call acceptance or the call rejection parameter with the voice template, and store the voice template and the correlated call acceptance or the correlated call rejection parameter in the database; and the second processing unit, configured to receive a request for the call, route the call to the first processing unit, receive the message from the first processing unit, route the call to the receiving party when the message is received, provide the identification information of the calling party to the receiving party;

wherein the first processing unit and second processing unit are in communication via an Internet Protocol network.

16. The system of claim 15, wherein the first processing unit is an intelligent peripheral, the second processing unit is a switching control point.

17. The system of claim 15, further comprising:

the database containing the plurality of stored voice templates, the database in communication with the first processing unit via the Internet Protocol network.

18. The system of claim 15, wherein the Internet Protocol network is the public Internet.

* * * * *